United States Patent [19]

Denzer

[11] 4,065,146
[45] Dec. 27, 1977

[54] CAMBERING DEVICE FOR CAMBERING VEHICLE

[75] Inventor: Richard E. Denzer, Bloomfield Hills, Mich.

[73] Assignee: General Motors Corporation, Detroit, Mich.

[21] Appl. No.: 727,591

[22] Filed: Sept. 28, 1976

[51] Int. Cl.[2] .................... B60G 19/00; B62K 15/00
[52] U.S. Cl. .................... 280/278; 280/112 A; 280/221; 280/293
[58] Field of Search ............... 280/87 R, 87 B, 112 R, 280/112 A, 278, 287, 6 R, 6 H, 6.1, 6.11, 200, 210, 218, 220, 221, 224, 21 R, 21 A, 12.1, 12 H, 282, 293, 87.04 R, 87.04 A, 283; 180/25 R, 25 A, 26 R, 41

[56] References Cited

U.S. PATENT DOCUMENTS

| | | | |
|---|---|---|---|
| 1,703,174 | 2/1929 | Roe | 280/287 X |
| 2,593,974 | 4/1952 | Brown | 280/21 R |
| 2,771,145 | 11/1956 | Peters | 180/26 |
| 3,033,585 | 5/1962 | Marston et al. | 280/12.1 X |
| 3,229,782 | 1/1966 | Hilton | 180/26 |
| 3,623,749 | 11/1971 | Jensen | 280/287 X |
| 3,964,563 | 6/1976 | Allen | 180/41 X |

FOREIGN PATENT DOCUMENTS

| | | | |
|---|---|---|---|
| 4,942,586 | 11/1974 | Japan | 280/87 R |
| 454,337 | 1/1950 | Italy | 280/293 |

Primary Examiner—Joseph F. Peters, Jr.
Assistant Examiner—Jack D. Rubenstein
Attorney, Agent, or Firm—Edward J. Biskup

[57] ABSTRACT

A cambering vehicle having pivoted trailing arms interconnected through a cambering device including a two-piece bell crank that incorporates locking means for allowing the trailing arms to be locked together for parking purposes and also folded towards the vehicle frame so as to provide a compact package which can be readily stowed.

3 Claims, 6 Drawing Figures

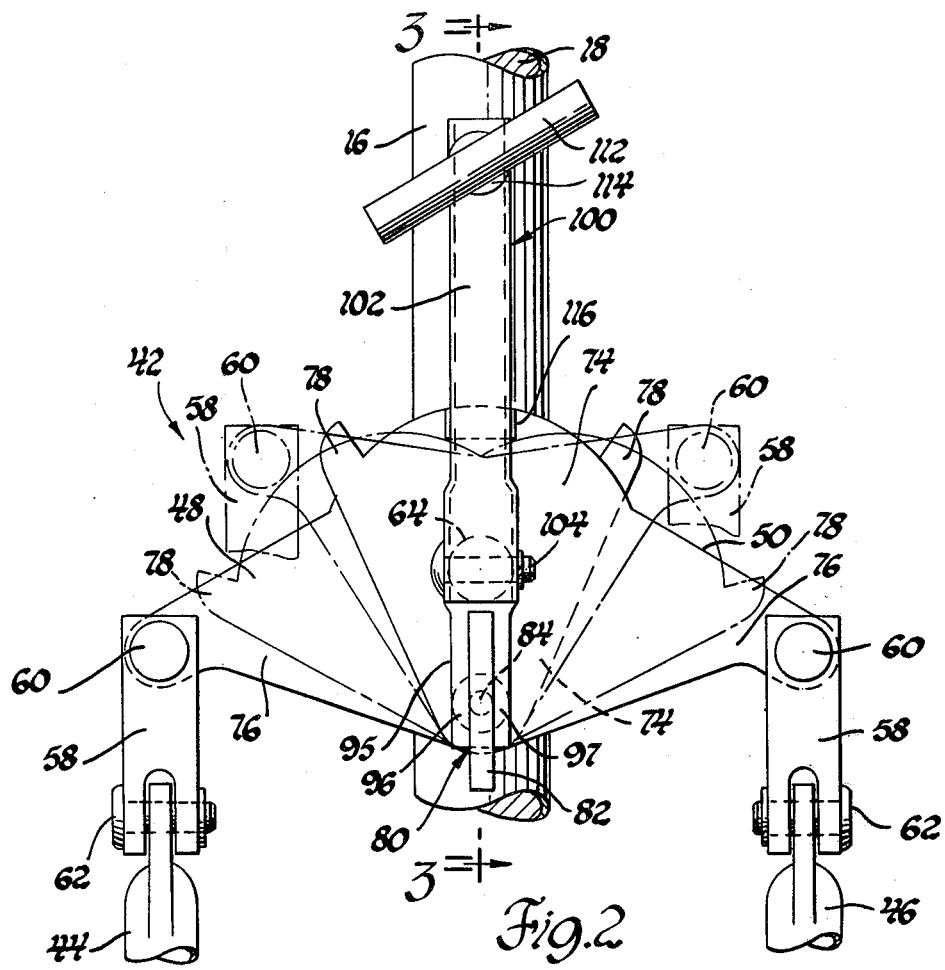

CAMBERING DEVICE FOR CAMBERING VEHICLE

This invention concerns cambering vehicles and more particularly relates to a cambering vehicle having a cambering device that incorporates a two-piece bell crank in which the parts thereof can be locked in various positions so as to permit the vehicle to be operated normally, collapsed into a compact configuration for stowage purposes, or parked on a level or inclined surface.

Copending patent application Ser. No. 713,411 filed Aug. 11, 1976 entitled "Cambering Vehicle" and assigned to the assignee of this invention concerns a cambering vehicle employing a cambering device which allows the trailing arms thereof to be locked relative to each other and folded towards the steering frame so the frame and trailing arms are positioned adjacent each other and extend in generally the same direction. In this manner, the vehicle is collapsible into a low profile configuration and provides a rigid package that can be grasped in one hand and placed in a relatively small compartment such as the trunk of an automobile. Two forms of cambering devices are disclosed by the aforementioned patent application with one employing cables and the other having link members for interconnecting the trailing arms and realizing controlled relative movement thereof as the vehicle negotiates a turn.

This invention contemplates a cambering vehicle of the above-described type in which the cambering device is characterized by having a two-piece bell crank that interconnects the trailing arms and includes a locking arrangement that allows the bell crank to be locked from movement relative to the steering frame so the vehicle can be parked on a level or inclined surface. In addition, the members of the bell crank can be rotated relative to each other and locked in position so that the trailing arms are located adjacent the steering frame of the vehicle for stowage purposes. More specifically, the cambering device incorporated with this vehicle has a bell crank consisting of a pair of wing members which are mounted by a pivot shaft carried by the steering frame for independent rotational movement about a common axis. The wing members are identical in configuration but mirror images of each other, and each is formed with a connecting portion that extends laterally outwardly for pivotal connection with one of the links of the cambering device. A lock device is carried by one of the wing members and has a spring projected locking pin which is adapted to extend through the two wing members of the bell crank for securing them together in a first position wherein the trailing arms are located for normal operation of the vehicle. By retracting the locking pin, the wing members are movable to a second position wherein the trailing arms are located adjacent the steering frame. A second locking device is carried by the steering frame and is adapted to urge the wing members into frictional engagement with the steering frame for maintaining the two members in a fixed position relative to the steering frame when the wing members are in the first position and in the second position so as to allow parking of the vehicle and facilitate stowage thereof.

The objects of the present invention are to provide a new and improved cambering vehicle having pivoted trailing arms and including a cambering device that has a two-piece bell crank which is combined with a pair of locking devices for selectively securing the two members of the bell crank in relative angular positions so as to allow the trailing arms to maintain a normal vehicle operating position, a stowed position, and a parked position; to provide an improved cambering device for a cambering vehicle having a bell crank consisting of a pair of substantially identical wing members which are independently rotatable about a common axis and can be locked in angularly related positions so as to permit the vehicle to be parked, operated in a conventional manner, or collapsed into a low profile configuration for stowage purposes; and to provide an improved cambering device for a cambering vehicle which through a pair of locking devices allows two independent parts of a bell crank to be rotated and locked in predetermined positions for collapsing the steering frame towards the trailing arms and for positioning the trailing arms for normal operation of the vehicle.

Other objects and advantages of the present invention will be more apparent from the following detailed description when taken with the drawings in which:

FIG. 2 is an enlarged elevational view taken on line 2—2 of FIG. 1 showing the bell crank portion of the cambering device.

FIG. 3 is a side elevational view taken on line 3—3 of FIG. 2, and

Figure 1:
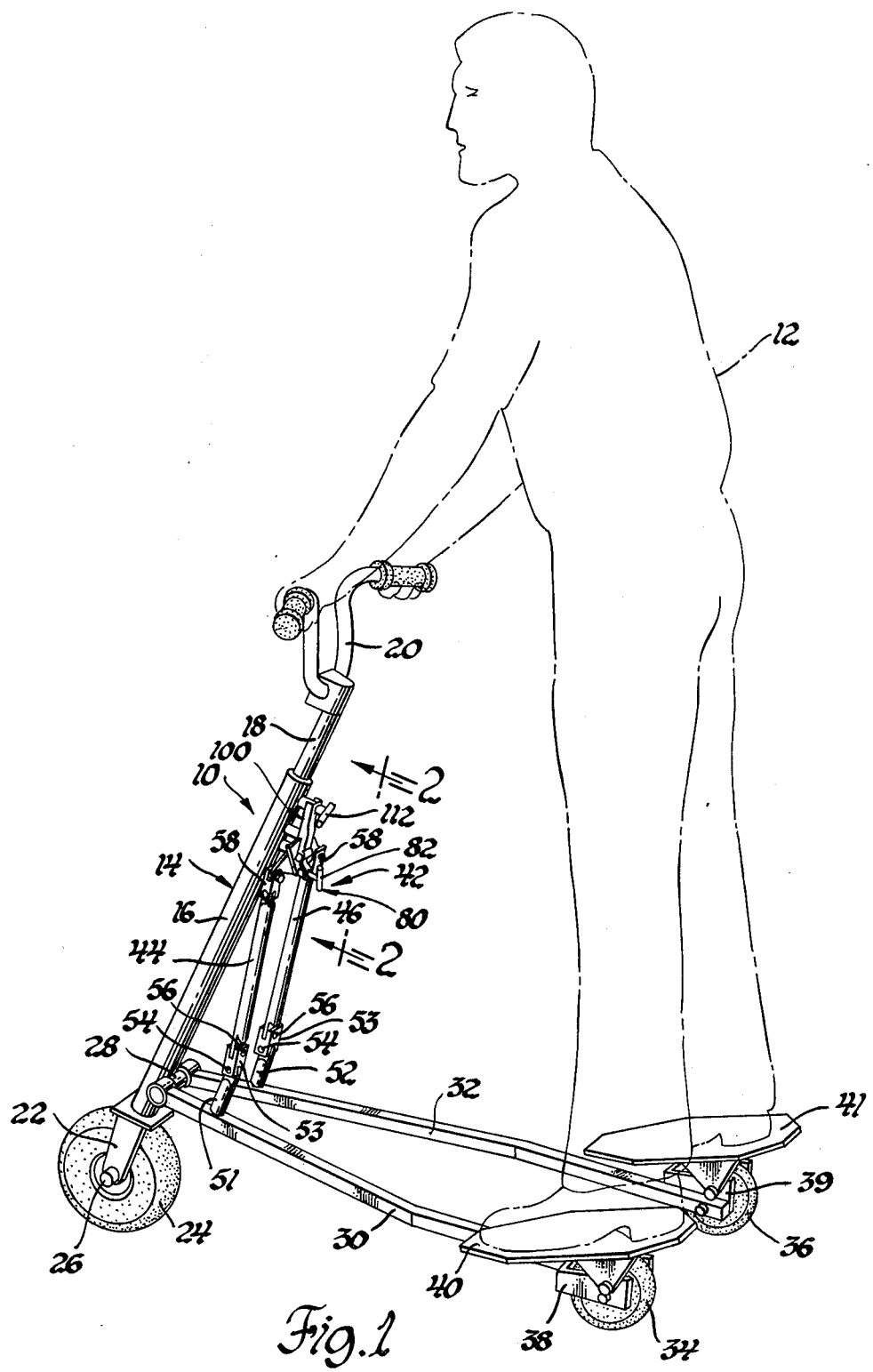
FIG. 1 is a perspective view showing a cambering vehicle incorporating a cambering device made in accordance with the invention.

Referring to FIG. 1 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type is disclosed in copending patent application, Ser. No. 649,967 filed on Jan. 19, 1976 and entitled "Cambering Vehicle," and reference is made to such application for a full understanding of how the vehicle is operated. It will also be noted that although a manually propelled vehicle is shown in FIG. 1, an internal combustion engine or an electric motor can be combined with the vehicle for driving the front wheel thereof.

The cambering vehicle 10 comprises a steering frame 14 which includes a tubular column 16 which serves to axially align and rotatably support an elongated steering shaft 18 which extends therethrough. The upper end of the steering shaft is provided with a handle bar assembly 20 while the lower end is formed with a fork 22 which rotatably supports the front wheel 24 of the vehicle. The wheel 24 rotates on an axle 26 which extends transversely through and is supported by the fork 22. The lower end of the tubular column 16 is rigidly formed with a transverse shaft 28, the outer ends of which pivotally support the front ends of a pair of laterally spaced trailing arms 30 and 32 which extend rearwardly and terminate with rear wheels 34 and 36 respectively supported for rotation by a pair of brackets 38 and 39, which in turn, pivotally support food pads 40 and 41.

Figure 6:
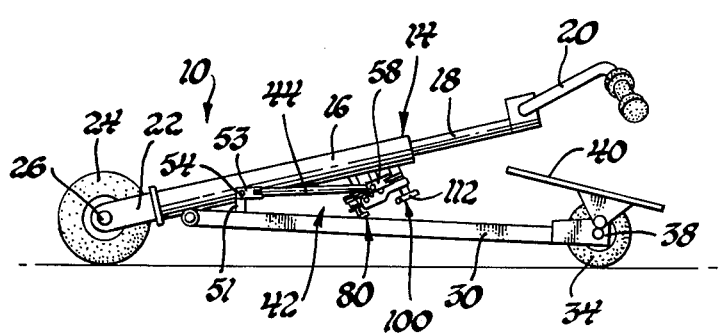

A cambering device 42 made according to the invention serves to interconnect the trailing arms 30 and 32 and when in the normal operating position, ensures that the pivotal movement of the trailing arms 30 and 32 about shaft 28 is equal and opposite. Accordingly, when the vehicle is leaned into a turn, all wheels thereof remain in contact with the ground and camber by an amount equal to vehicle roll. More specifically and as seen in FIGS. 1 and 2, the cambering device 42 includes a pair of links 44 and 46 and a bell crank comprising a pair of wing members 48 and 50. The lower ends of the links 44 and 46 are respectively connected to rigid upstanding posts 51 and 52 at the front portions of the trailing arms 30 and 32. In each instance, an intermediate connector member 53 serves to connect the lower end of the link to the associated post by a transversely extending lower pivot bolt member 54 and a longitudinally extending lower pivot bolt member 56 so as to provide a universal connection at each lower joint. Similarly, the upper ends of the links 44 and 46 are connected to the members 48 and 50 through intermediate connector members 58 by longitudinally extending upper pivot bolt members 60 and transversely extending pivot ball members 62. The lower and upper pivot bolt members acting through the associated connector member permit universal pivotal movement of the upper end and the lower end of the associated link member. This arrangement allows the steering frame 14 to be folded towards the trailing arms 30 and 32 as seen in FIG. 6 in a manner to be more fully described hereinafter.

As seen in FIGS. 2 and 3, the wing members 48 and 50 are in overlapping relationship and are supported for pivotal movement by a pivot shaft 64 which is secured to the upper portion of the tubular column 16. In this regard, it will be noted that the wing member 48 is fixed with a spacer sleeve 66 which together with the wing member 50 is rotatably supported on a bushing 68 carried by the pivot shaft 64. The wing members 48 and 50 are restrained from axial movement along the pivot shaft 64 by a ring 70 and a shoulder 72 formed with the bushing 68. The wing members 48 and 50 each have a triangular form that includes a body portion 74 and a connecting portion 76. The wing members are identical in shape but mirror images of each other and each includes a radially extending tab 78 formed with the body portion thereof.

A locking device 80 is carried by the member 50 and includes a handle 82 secured to the outer end of a cylindrical shaft 84. The inner end of the shaft 84 is rigidly formed with enlarged circular head 86 slidably located within a guide cylinder 88 which is rigidly secured to the wing member 50. The head 86 terminates with a locking pin 90 which is adapted to extend into registering apertures 92 and 94 respectively formed in wing members 48 and 50. A leaf spring 95 has its upper portion rotatably mounted on the pivot shaft 64 and its lower end is formed with a pair of tangs 96 and 97 which straddle the shaft 84 and engage a rigid shoulder 98 thereof to continuously bias the locking pin 90 towards the wing members 48 and 50. Thus, it should be apparent that when the locking pin 90 is in the position of FIG. 3, the wing members 48 and 50 of the bell crank are locked together in fixed relative positions and the wing members can rotate as a unit about the pivot shaft 64. However, when the locking pin 90 is retracted from the apertures 92 and 94, the wing members 48 and 50 can be independently rotatable about pivot shaft 64 and are in an unlocked condition.

A locking device 100 is also incorporated with the cambering device 42 and includes a lever 102 the lower end of which is pivotally connected to the outer end of the pivot shaft 64 by a transverse pin 104. The lever 102 is channel-shaped in cross section and the upper end thereof is formed with a circular opening 106 through which a threaded stud 108 extends. The stud 108 is rigidly mounted on a boss 110 secured to the tubular column 16. It will be noted that the locking device 100 also includes a handle 112 rigidly secured to the outer end of a cylindrical sleeve 114, the inner end of which is threadedly received by the stud 108 fixed with the column 16. Thus, by rotating the handle 112 in a clockwise direction as seen in FIG. 2, the sleeve 114 advances forwardly and the lever 102 is pivoted in a counterclockwise direction as seen in FIG. 3, and causes a jaw 116 secured to the lever 102 to cooperate with an aligned fixed jaw 117 rigid with the column 16 to frictionally clamp the wing members 48 and 50 between the jaws in the manner of a vise and prevent rotational movement of the wing members relative to the steering frame 14. It will be noted that the boss 110, jaw 117, and pivot shaft 64 are interconnected by web members 118 and 119.

During normal operation of the cambering vehicle 10, the trailing arms 30 and 32 are free to pivot in opposite directions up and down about the support shaft 28 with the movement of the trailing arms being controlled by the cambering device 42. The operating position of the wing members 48 and 50 of the bell crank during the normal operation of the vehicle is as shown in full lines in FIG. 2. In order to maintain the wing members 48 and 50 in the fixed relative positions shown and allow rotation of the bell crank as a unit about pivot shaft 64, the lock pin 90 of the locking device 80 is in the locked condition and is located in the registering apertures 92 and 94 formed in the wing members 48 and 50 and the jaw 116 would be spaced from the wing members by rotating the handle 112 in a counterclockwise direction. Thus, the members 48 and 50 are locked to each other thereby permitting the two parts of the bell crank to be free to rotate as a unit about the pivot shaft 64 and allow the trailing arms 30 and 32 to move up and down as controlled by the links 44 and 46 when the vehicle 10 is leaned into a turn. Rotation of the bell crank during such time is limited by the engagement of the tabs 78 with the side walls of the lever 102.

Figure 5:
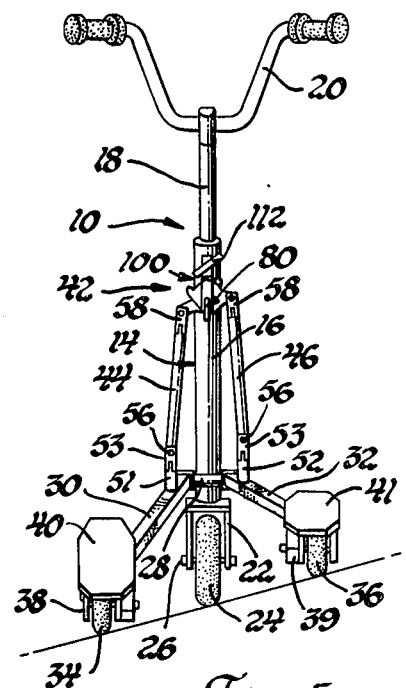

After the vehicle has been operated, the trailing arms 30 and 32 can be fixed in positions relative to the steering frame for parking purposes by rotating the handle 112 of locking device 100 in a clockwise direction to cause the sleeve 114 to urge the upper end of the lever 102 towards the boss 110 and thereby clamp the bell crank as a unit between the jaws 116 and 117 to the column 16. As a result, movement of the trailing arms 30 and 32 through the links 44 and 46 is prevented. It will be noted that the vehicle can be parked either on a level surface or an inclined surface. When the vehicle is parked on an inclined surface as seen in FIG. 5, the centers of the upper pivot bolt members 60 will be located in an inclined plane which will be substantially parallel to the incline on which the vehicle is parked. On a level surface, the bell crank will assume the position of FIG. 2, and clockwise rotation of the handle 112 will cause the jaws 116 and 117 to frictionally clamp the wing members to the column 16 and cause locking of the bell crank to the steering frame.

Figure 4:
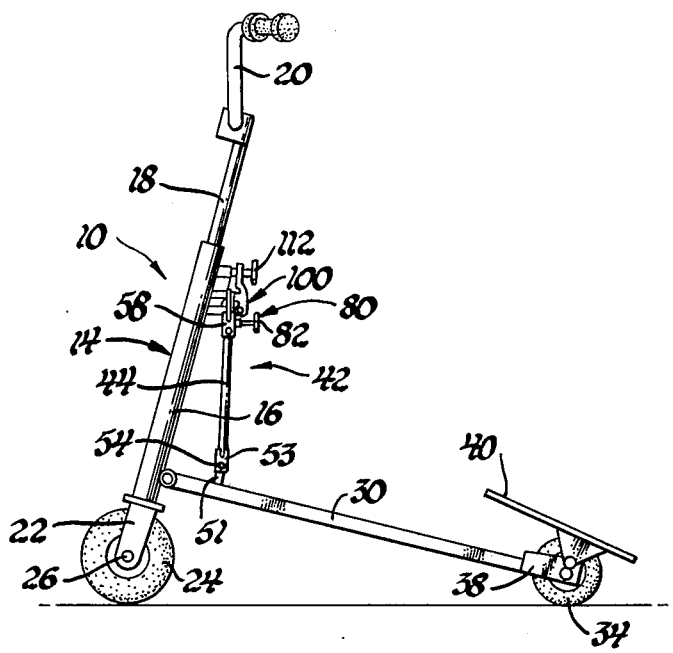
FIGS. 4, 5 and 6 show the cambering vehicle of FIG. 1 in the normal operating position, parked position, and the stow position, respectively.

The above-described cambering device also allows the vehicle 10 to be folded and locked into a compact configuration as seen in FIG. 6. In other words, the steering frame 14 can be collapsed towards the trailing arms 30 and 32 so that the steering frame 14 assumes a generally aligned position with the trailing arms. This can be realized by first placing both locking devices 80 and 100 in an unlocked condition so that the members 48 and 50 are not neither locked to each other nor locked to the tubular column 16. The handle bar assembly 20 is then pulled rearwardly causing the steering frame 14 to pivot about the shaft 28 from the position in FIG. 4 to the position in FIG. 6. During this folding movement of the steering frame 14, the wing member 48 is rotated in a clockwise directin about pivot shaft 64 to the phantom line position as seen in FIG. 2 while the wing member 50 is rotated in a counterclockwise direction to the phantom line position shown. The universal connections provided at the upper and lower ends of the links 44 and 46 permit the collapsing of the vehicle as described above and once the vehicle is folded into the position of FIG. 6, handle 112 of locking device 100 is rotated in a clockwise direction to lock the two wing members 48 and 50 to the tubular column 16. As should be apparent, when the wing members 48 and 50 are locked to the steering frame 14 with the latter in the folded position of FIG. 6, any part of the vehicle 10 can be grasped in one hand and the vehicle can be carried to an area where it is to be stowed.

Various changes and modifications can be made in this construction without departing from the spirit of the invention. Such changes and modifications are contemplated by the inventor and he does not wish to be limited except by the scope of the appended claims.

I claim:

1. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a bell crank comprising a pair of wing members mounted on said steering frame for pivotal movement about a common axis, a pair of links, means pivotally connecting one of said links between one of said wing members and one of said trailing arms, means pivotally connecting the other of said links between the other of said wing members and the other of said trailing arms, each of said wing members having an opening formed therein, a locking pin carried by one of said wing members and adapted to be located in the opening in each wing member for securing said wing members together in a first position wherein said trailing arms are positioned relative to the steering frame for normal operation of said vehicle, a handle connected to said locking pin for removing the latter from the opening in one of the wing members so that the wing members are movable to a second position wherein said trailing arms are located adjacent said steering frame so the vehicle can be stowed in a minimum of space, and a lock device carried by said steering frame and including a pair of jaws for clamping said wing members therebetween and thereby maintaining said bell crank in a fixed position relative to said steering frame when said wing members are in either of said first or second positions.

2. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a bell crank comprising a pair of substantially identical overlapping wing members mounted on said steering frame for pivotal movement about a common axis, a pair of links, means pivotally connecting one of said links between one of said wing members and one of said trailing arms, means pivotally connecting the other of said links between the other of said wing members and the other of said trailing arms, each of said wing members having an opening formed therein, a locking pin carried by one of said wing members, spring means normally urging said locking pin into the opening in each wing member for securing said wing members together in a first position wherein said trailing arms are located relative to the steering frame for normal operation of said vehicle, a handle connected to said locking pin for removing the latter against the bias of said spring means from the opening in one of the wing members so that the wing members are movable to a second position wherein said trailing arms are located adjacent said steering frame so the vehicle can be stowed in a minimum of space, and a lock device carried by said steering frame and including a pair of jaws for clamping said wing members therebetween and thereby maintaining said bell crank in a fixed position relative to said steering frame when said wing members are in either of said first or second positions.

3. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a bell crank comprising a pair of members mounted on a pivot shaft secured to said steering frame for pivotal movement about a common axis, a pair of links, means pivotally connecting one of said links between one of said members and one of said trailing arms, means pivotally connecting the other of said links between the other of said members and the other of said trailing arms, each of said members having an opening formed therein, a locking pin carried by one of said members and adapted to be located in the opening in each member for securing said members together in a first position wherein said trailing arms are positioned relative to the steering frame for normal operation of said vehicle, a handle connected to said locking pin for removing the latter from the opening in one of the members so that the members are movable to a second position wherein said trailing arms are located adjacent said steering frame so the vehicle can be stowed in a minimum of space, and a lock device carried by said steering frame and including a pair of jaws for clamping said wing members therebetween and thereby maintaining said bell crank in a fixed position relative to said steering frame when said members are in either of said first or second positions, said lock device including a lever pivotally supported by said pivot shaft for operating said pair of jaws.

* * * * *